United States Patent [19]

Akahoshi et al.

[11] Patent Number: 5,690,975
[45] Date of Patent: Nov. 25, 1997

[54] METHODS FOR PRODUCING CALCIUM ENRICHED FERMENTED MILK AND FERMENTED MILK DRINK

[75] Inventors: Ryoichi Akahoshi; Mika Irie; Yoshiharu Kuma, all of Tokyo, Japan

[73] Assignee: Kabushiki Kaisha Yakult Honsha, Tokyo, Japan

[21] Appl. No.: 542,922

[22] Filed: Oct. 13, 1995

[30] Foreign Application Priority Data

Oct. 17, 1994 [JP] Japan .................. 6-277085

[51] Int. Cl.⁶ ........................... A23C 9/12
[52] U.S. Cl. ............. 426/34; 426/42; 426/43; 426/74; 426/577; 426/580; 426/583
[58] Field of Search ................ 426/34, 42, 43, 426/577, 583, 74, 573, 574, 580, 519

[56] References Cited

U.S. PATENT DOCUMENTS 4,391,830  7/1983  Gudnason et al. .................. 426/43
4,784,871  11/1988 Park ................................. 426/583
5,449,523  9/1995  Hansen et al. ..................... 426/42

OTHER PUBLICATIONS

JAPIO, AN 80–050885, JP–A–55 50885, Apr. 14, 1980.
JAPIO, AN 92–360645 JP–A–4 360645, Dec. 14, 1992.
JAPIO, AN 93–252903, JP–A–5 252903, Oct. 5, 1993.

*Primary Examiner*—Leslie Wong
*Attorney, Agent, or Firm*—Oblon, Spivak, McClelland, Maier & Neustadt, P.C.

[57] ABSTRACT

The present invention relates to a method for producing calcium enriched fermented milk or fermented milk drink, where blockwise-type HM pectin, calcium individually together with syrup is added into lactic acid-fermented acidified milk, and then the mixture is subjected to a homogenizing treatment. Also a method for producing calcium enriched fermented milk or fermented milk drink, where lactic acid-fermented acidified milk is subjected to a homogenizing treatment, syrup and blockwise-type HM pectin is added therein and mixed, and calcium is added therein and then mixed. Moreover, it relates to calcium enriched fermented milk or fermented milk drink having excellent physical stability obtained by said methods.

5 Claims, No Drawings

METHODS FOR PRODUCING CALCIUM ENRICHED FERMENTED MILK AND FERMENTED MILK DRINK

BACKGROUND OF THE INVENTION

1. Field of the Invention

The present invention relates to methods for producing calcium enriched fermented milk or fermented milk drink free from the change of viscosity thereof, causing neither separated ingredients nor precipitate, and capable of being stored for a long period of time, and the products, and more specifically this invention relates to drastic methods for producing calcium enriched fermented milk or fermented milk drink capable of producing fermented milk products such as nutritionally excellent drink-type yoghurt products enriched by calcium other than milk-derived calcium, and at the same time capable of producing high quality products having low viscosity and physical stability, and capable of being stored for a long period of time, and the products.

2. Description of Prior Arts

When fermented milk drinks, namely, fermented milk drink, fermented milk drink as dairy products and fermented milk, are produced, they have generally been produced by mixing acidified milk (liquid material containing lactic acid bacterium) obtained by the lactic acid fermentation with syrup containing sugar and the like, and subjecting the mixture to a homogenizing treatment. When products produced by such a method are stored in that state, however, casein, an ingredient of milk, often precipitates or associates and aggregates, and as a result the drinks often increase their viscosity during storage, or the contents thereof are separated, which have become large factors degrading the quality of products.

Generally, when milk is acidified, water-insoluble casein as an ingredient of milk repulse electrically, since it is charged positively and is in a physically stable state for some time; however, if the electric charge is weak and therefore the electrical repulsion is weak or the density of casein is high, it fails to repulse electrically and the above physically stable state collapses; the degradation of the quality of such drinks during storage is a phenomenon caused by the above. Hence, in order to avoid such a phenomenon, a method which comprises of wrapping casein with pectin by adding pectin in the above fermented milk drinks and stabilizing the physical properties thereof by utilizing the negative electrical repulsion of said pectin is employed.

In case of enriching calcium by adding calcium into the acidified milk stabilized physically with pectin in this way, generally calcium is added into syrup containing sugar together with pectin to dissolve it, and compounded with acidified milk obtained according to lactic acid fermentation and then mixed. In this case, as pectin used for acidified milk has generally been used ordinary HM pectin; though it has a low reactivity with calcium, one-third of carboxyl groups of said pectin has reactivity with calcium and as a result the viscosity of syrup rises somewhat. However, the rising of the viscosity of syrup in this case is not so disadvantageous for the production of desired drinks. Pectin is not such a single chemical substance as sodium chloride and sugar but a mixture of several kinds of galacturonic acid with different molecular weights partially methylated. According to the existing laws and regulations of food, pectin is defined definitely as follows. Namely, pectin is a kind of complex high-molecular polysaccharide, and its main ingredients comprise partially methyl-esterified polygalacturonic acid, a very small amount of sodium salt, potassium salt and ammonium salt contained therein. A galacturon-amide group exists in a polysaccharide chain additionally in some kinds thereof, such as amidated pectin. Such products are obtained from proper food vegetable materials according to extraction with hot water, and generally citrus fruits and apples are used as the materials.

As described in such a definition, the molecule of pectin comprises alpha-1,4-D-galacturonic acid as a skeleton. The main chain of galacturonic acid is partially esterified (methylated), and the degree of esterification (DE) is shown by a ratio of carboxylic acid esterified by methyl alcohol. When the degree of esterification exceeds 50%, the pectin is called highly esterified pectin or high methoxyl pectin (HM pectin). When the degree of esterification is less than 50%, the pectin is called low esterified pectin or low methoxyl pectin (LM pectin).

Thus, the degree of esterification generally varies variously according to vegetable materials, and also varies according to the manner of preparing pectin prior to analysis. Apples have a high degree of esterification exceeding 80%. Other fruits, tomatoes and sunflowers also have a high degree of esterification. However, vegetables generally have a relatively low degree of esterification.

As described above, it has been known as a general method to stabilize acidified milk with HM pectin extracted from apples and citrus fruits; however, conventionally used pectin has a weak stability and hence when drinks are produced by using said pectin, precipitate, separated and aggregated ingredients occur during the storage thereof, which often degrades the quality of the drinks during storage.

On the other hand, according to the development of researches on pectin, chemical and physical characteristics of pectin have been revealed and new types of HM pectin with a higher titer than those of conventional types of HM pectin have been developed. Namely, while conventionally used pectin is such a type as non-esterified free carboxyl groups are distributed uniformly on the main chain of galacturonic acid (randomwise type), such a type as free carboxyl groups are omnipresent collectively at a certain portion of the main chain of galacturonic acid (blockwise type) has been developed.

The distribution of free carboxyl groups has important influence upon the determination of characteristics of pectin. When 10 to 15 of galacturonic acid having free carboxyl groups are collected, a calcium ion can crosslink two of such molecules. This cross/inking reaction brings the increase of viscosity or the formation of a strong gel with a calcium base.

An interaction between casein with positive electric charge and pectin also varies according to the above two kinds of pectin. Namely, while an interaction between casein and randomwise-type pectin with carboxyl groups distributed uniformly thereon occurs only at a very high concentration of said pectin, a reaction between casein and blockwise-type pectin with carboxyl groups omnipresent thereon or low methyl pectin occurs even at a low concentration of said pectin. A crosslinking reaction is an electrostatic interaction and has an extremely high pH dependence, and said pectin shows a optimum stability as solution at a pH of around 3.5–4.2 overlapping with the range of a pH of acidified milk.

Thus, a new type of blockwise-type pectin with a strong linking potency with casein in milk causing the above-mentioned precipitate, separated and aggregated ingredients and having a high titer has been developed recently, and the potency of pectin wrapping casein has become strong according to the use of such a type of pectin and physical properties thereof have rapidly been improved. However, blockwise-type pectin with a strong linking potency with casein and a high titer also has a strong linking potency with calcium; for example, when calcium is enriched, the viscosity of syrup becomes very high because of the existence of both pectin and calcium in syrup, and as a result a problem that it is difficult to handle said syrup occurs, because it cannot be transferred by means of a pump.

In addition to such circumstances, it becomes an essential condition to mix syrup and acidified milk such as yoghurt and to subject the mixture to a special homogenizing treatment in order to link pectin with casein, since pectin originally to be linked with casein is crosslinked with a calcium molecule, and hence a special producing process is needed additionally, which leads to a large problem on labor and production cost. Hence, though the above-mentioned new type of blockwise-type pectin with a strong linking potency with casein and a high titer has been developed, the use thereof is restricted to products with no calcium enriched, or when calcium is enriched, desired acidified milk is produced by using a conventional type of pectin with a weak linking potency with calcium or casein and a weak titer, mixing syrup containing pectin and calcium with acidified milk such as yoghurt, and then subjecting the mixture to a homogenizing treatment, or by homogenizing only acidified milk such as yoghurt, mixing it with syrup containing pectin, and then mixing the mixture further with calcium.

However, it is still difficult according to such methods to produce calcium enriched and physically stabilized acidified milk, and since it is technically restricted and difficult to produce calcium enriched fermented milk and fermented milk drink with high-level quality only according to such methods, it has been keenly demanded in the field concerned to develop drastic production techniques replacing such methods.

From such circumstances, the present inventors have engaged in assiduous studies with a view to establishing a new production technique capable of dissolving various problems found in the above-mentioned conventional methods of production fundamentally and also capable of producing calcium enriched and physically stabilized fermented milk and fermented milk drink, and as a result have found that the desired object can be accomplished by using HM pectin, particularly, the above-mentioned blockwise-type pectin with a high titer and at the same time improving a method of adding pectin and/or calcium fundamentally, which has led to the accomplishment of the present invention.

SUMMARY OF THE INVENTION

The object of the present invention is to provide methods for producing calcium enriched fermented milk or fermented milk drink having excellent physical stability, and the products.

The present invention relates to a method for producing calcium enriched fermented milk or fermented milk drink, which comprises of adding HM pectin, calcium individually together with syrup into lactic acid-fermented acidified milk, and then subjecting the mixture to a homogenizing treatment, and a method for producing calcium enriched fermented milk or fermented milk drink, which comprises of subjecting lactic acid-fermented acidified milk to a homogenizing treatment, adding syrup and blockwise-type HM pectin therein and then mixing them, and adding calcium therein and then mixing them. Moreover, it relates to calcium enriched fermented milk or fermented milk drink having excellent physical stability obtained by said methods.

According to the present invention, they can be produced at a high production efficiency by using blockwise-type HM pectin having a high titer, without causing the rise of viscosity of the products due to gelation, even though calcium having a high reactivity with said pectin is enriched. In addition, even if the products are stored for a long period of time, they have entirely no problems such as causing precipitate, separated and aggregated ingredients which considered as problems to be solved, and can be obtained such products as stabilized physically and capable of being stored for a long period of time.

DETAILED DESCRIPTION OF THE INVENTION

An object of the present invention is to provide a method for producing nutritionally excellent fermented milk or fermented milk drink enriched with calcium therein by adding calcium other than milk-derived calcium.

Besides, another object of the present invention is to provide a new method for producing calcium enriched and physically stabilized fermented milk or fermented milk drink having high quality and a low viscosity.

Further, another object of the present invention is to provide a method for producing calcium enriched and physically stabilized fermented milk or fermented milk drink with high quality and free from causing precipitate, separated and aggregated ingredients during storage, and the products.

The present invention accomplishing these objects is consisting of the following technical means (1)–(4).

(1) A method for producing calcium enriched fermented milk or fermented milk drink having excellent physical stability, which comprises of adding HM pectin, calcium individually together with syrup into lactic acid-fermented acidified milk, and then subjecting the mixture to a homogenizing treatment.

(2) A method for producing calcium enriched fermented milk or fermented milk drink having excellent physical stability, which comprises of subjecting lactic acid-fermented acidified milk to a homogenizing treatment, adding syrup and HM pectin thereinto and then mixing them, and adding calcium into the mixture and then mixing them.

(3) The method for producing calcium enriched fermented milk or fermented milk drink according to (1) or (2) above, wherein the HM pectin is blockwise-type pectin.

(4) The calcium enriched fermented milk or fermented milk drink having excellent physical stability obtained by the method as described in (1) or (2) above.

Next, the present invention will be described more in detail.

As described above, the present invention relates to a method for producing calcium enriched fermented milk or fermented milk drink having excellent physical stability, which comprises of adding HM pectin, calcium individually together with syrup into lactic acid-fermented acidified milk (liquid material containing lactic acid bacterium), and then subjecting the mixture to a homogenizing treatment, and a method for producing calcium enriched fermented milk or fermented milk drink having excellent physical stability, which comprises of subjecting lactic acid fermented acidified milk to a homogenizing treatment, adding syrup and HM pectin thereinto and then mixing them, and adding calcium into the mixture and the mixing them, and further relates to calcium enriched fermented milk or fermented milk drink having excellent physical stability obtained by said methods.

In this case, as lactic acid fermented acidified milk according to the present invention may be used any one, irrespective of kind, so far, as it is a fermented dairy product or its similar product obtained by lactic acid fermenting milk, or a dairy product or its similar product; for example, an acidified liquid (liquid material containing lactic acid bacterium) using as a base of so-called fermented milk drink as dairy products obtained by adding skim milk powder, sugar and a stabilizer into whole milk or skim milk, homogenizing the mixture according to a pasteurizing treatment at 85° C. for some 30 seconds, then cooling the mixture to 40° C. and adding a starter thereinto, and then performing lactic acid fermentation for 4–6 hours to make a pH thereof 4.3, or that obtained by adding whey protein into whole milk or skim milk and lactic acid-fermenting the mixture in the same manner, can be mentioned as typical ones.

Next, syrup to be used in the present invention means an additional additive ingredient obtained by adding a flavor ingredient, a nutritional ingredient and a viscosity-regulating ingredient as required into a sweetener and fruit juice as a base, and as syrup may be used any one so far as it is composed of a sweetener and fruit juice as a base and is not particularly restricted, and preferable examples thereof include sugar, glucose, liquid sugar of fructose, aspartame, sugar alcohol, orange juice, strawberry juice and lemon juice.

Next, as HM pectin to be used together with syrup in the present invention can be used proper ones and there is no particular restriction, and as described above, blockwise-type HM pectin with a high titer may be mentioned as a preferable, one. In such blockwise-type HM pectin, free carboxyl groups are omnipresent at a certain portion of the main chain of galacturonic acid of pectin collectively, and hence it is linked with a casein molecule existing in milk ingredients even at a low concentration of pectin and has a strong effect of stabilizing it.

Besides, as calcium to be used in the present invention, can be used any one capable of being used as a food additive, irrespective of kind and form, and there is no particular restriction, and preferable examples thereof include calcium gluconate, calcium chloride and lactic acid calcium. It is preferable to use them in the form of an aqueous solution.

In the present invention, HM pectin and calcium are added into acidified milk obtained according to lactic acid fermentation as described above together with syrup as essential ingredients, and other ingredients except the above ingredients are not particularly restricted and can be added properly as ingredients capable of being used optionally and additionally.

Next, each process relating to the methods for producing of the present invention will be described, and a first embodiment of the present invention comprises of adding HM pectin, calcium individually together with syrup into acidified milk, and then subjecting the mixture to a homogenizing treatment. Regarding adding HM pectin, calcium individually together with syrup into acidified milk in this case, any method can be employed so far as it is a method comprising of adding HM pectin and calcium separately without mixing them in advance; specifically, for example, calcium may be added into syrup in advance or pectin may be added into syrup in advance; in the former case, it is necessary to prepare acidified milk, syrup (containing calcium) and pectin separately, mix them and subject the mixture to a homogenizing treatment according to an ordinary procedure, and in the later case, it is necessary to prepare acidified milk, syrup (containing pectin) and calcium separately, mix them and subject the mixture to a homogenizing treatment according to an ordinary procedure. The description of adding HM pectin, calcium individually together with syrup into acidified milk and then subjecting the mixture to a homogenizing treatment in the present invention includes the case of adding them simultaneously and treating them simultaneously.

It is important to employ such processes of production in the present invention, which links casein existing in the ingredients of milk and pectin effectively and prevents the rise of the viscosity of products surely according to a homogenizing treatment performed simultaneously, even if blockwise-type HM pectin with a high titer and a high reactivity with calcium is used and calcium is added, and also makes it possible to prevent the impossibility of production surely, even if viscosity becomes high, and as a result it is possible to prevent causing precipitate, separated and aggregated ingredients of drinks, even if obtained products are stored for a long period of time, and to produce products capable of being stored for a long period of time.

In this case, even if, for example, syrup containing pectin and calcium is prepared in advance, and after they are added into the above-mentioned acidified milk, a mixing or homogenizing treatment is performed, HM pectin with a high titer and a calcium ion react in syrup and forms a strong gel, and as a result the viscosity of the syrup becomes extremely high, which interferes with its production considerably; as is apparent from the above-mentioned result, it is important in the above process of production in the present invention to add a pectin liquid, calcium individually together with syrup into lactic acid fermented acidified milk or simultaneously and subjecting the mixture to a homogenizing treatment, and it becomes possible to accomplish the desired object by employing such a constitution.

Next, a second embodiment of the present invention comprises of subjecting acidified milk to a homogenizing treatment, adding syrup and HM pectin thereinto and then mixing them, adding calcium thereinto, and then subjecting the mixture to a mixing treatment. In this case, a homogenizing treatment is performed only upon acidified milk, and only a mixing treatment need be performed when syrup, HM pectin and calcium are added; thus the process for production can be made extremely simple. Besides, it is important in the present invention to add calcium after adding syrup and HM pectin into homogenized acidified milk and subjecting the mixture to a mixing treatment at the time of compounding these ingredients, which makes it possible to form a system linking casein existing in the ingredients of milk and HM pectin stably and to block free carboxyl groups omnipresent at a specific portion of the main chain of galacturonic acid of pectin.

Hence, even if a calcium ion is added after the formation of such a system, a gelation phenomenon by a calcium ion of HM pectin is fairly controlled and as a result it becomes possible to avoid the rise of the viscosity of products surely, and to obtain products with a low viscosity and physically stabilized, for example, even if blockwise-type HM pectin with a high titer and a high reactivity with calcium is used.

Thus, the present invention makes it possible to avoid the reaction of said HM pectin and calcium surely and to accomplish the linking of casein in the ingredients of milk and said HM pectin at a high efficiency by improving a method of adding calcium into a system comprising of acidified milk and syrup, in spite of using HM pectin with a high titer, for example, blockwise-type HM pectin with a high titer and a high reactivity with calcium, and such results can be obtained by employing the above-mentioned constitution of the present invention.

Each processing means to be employed in each process of the methods for producing of the present invention may be any ordinary processing means and is not particularly restricted. For example, the preparation of each material of acidified milk, syrup, EM pectin and calcium may be performed according to an ordinary procedure, and syrup containing pectin or calcium with a sweetener and fruit juice as a base may be pasteurized by subjecting it to a low-temperature heating pasteurizing treatment at 110° C. for three seconds.

The compounding of each material prepared in this manner may be performed by a mixing treatment under a stir-mixing condition of 20–500 rpm for 10–60 minutes by means of a stir-mixing device such as a tank for producing drinks. A treatment for homogenizing acidified milk or a homogenizing treatment after the addition of each material may be performed, for example, under homogenizing conditions of 10° C. and 150 kg/cm$^2$ by means of a device of a homogenizer according to an ordinary procedure. Products produced by processing means of processes are put into proper containers such as plastic vessels, glass vessels and paper vessels according to an ordinary procedure as final products.

Fermented milk or fermented milk drink in the present invention include all of so-called fermented milk drinks, fermented milk drinks as dairy products or fermented milk generally defined in the field concerned, and also include similar processed products prepared by changing these materials variously and similar products.

Next, the effects of the present invention will be described; first of all, casein existing in the ingredients of acidified milk is an amphoteric molecule and hence the whole charge thereof changes according to a degree of acidification; generally, it is charged positively at a pH of 3.6–4.4 of acidified milk obtained by lactic acid fermentation. On the other hand, regarding blockwise-type HM pectin with a high titer, free carboxyl groups with a strong reactivity with a calcium ion are omnipresent collectively at a certain portion of the main chain of galacturonic acid thereof and form a block, and when ordinary syrup with said HM pectin and a calcium ion present therein simultaneously is prepared, the pectin forms a stronger gel together with the calcium ion in the syrup than randomwise-type pectin, and as a result the viscosity of the syrup becomes very high, which causes a problem that it cannot be transferred by means of a pump.

In the present invention, it becomes possible to react the positive charge on the surface of a molecule of casein present in the ingredients of acidified milk with carboxyl groups of the above-mentioned HM pectin preferentially by employing a method of adding a pectin solution, a calcium solution individually together with syrup without allowing said HM pectin with a high titer to coexist with a calcium ion simultaneously or a method of adding a calcium solution after mixing acidified milk with pectin-containing syrup, which makes it possible to block the reaction between an enriched calcium ion and said pectin present in these systems effectively.

In case of using randomwise-type pectin, free carboxyl groups are distributed on the main chain of galacturonic acid of said pectin uniformly, and hence though a gel obtained by a reaction thereof with a calcium ion is weak, it becomes difficult to block positive charge on the surface of a pectin molecule surely, and as a result considerable portions of free carboxyl groups of said pectin react with a calcium ion, and the function and mechanism thereof become greatly different from those of the present invention.

As described above, the present invention is greatly different from the case of employing ordinary pectin of prior arts from the viewpoints of its action and mechanism, and the effects of the present invention are deemed to be peculiar to the case of employing the above method.

EXAMPLES

Subsequently, the embodiment of the present invention will be described specifically according to Examples; however, the present invention is not restricted to said Examples.

Example 1

(1st Process)

A 350 ml of solution containing 25% skim milk powder was pasteurized at 100° C. for 15 minutes and cooled to 37° C., and then inoculated with *St. thermophilus* and *L. bulgaricus* and incubated to a pH of 4.3 to obtain yoghurt as acidified milk.

(2nd Process)

On the other hand, in order to prepare syrup, 7 g of a sweetener of sucrose, 10 ml of orange juice and 3.5 g of blockwise-type HM pectin (manufactured by Copenhagen Pectin) were dissolved into water to adjust to 500 ml, and pasteurized at 100° C. for 15 minutes and then cooled to less than 10° C.

In order to enrich calcium, 5 g of calcium gluconate were dissolved into water to adjust to 150 ml, and pasteurized at 100° C. for 15 minutes and then cooled to less than 10° C.

(3rd Process)

Subsequently, 350 ml of the above yoghurt, 500 ml of the syrup and 150 ml of a calcium solution were mixed, and homogenized at a pressure of 150 kg/cm$^2$ to obtain a drink-type calcium-enriched and physically stabilized yoghurt product of the present invention.

EXAMPLE 2

(1st Process)

A 350 ml of solution containing 25% skim milk powder was pasteurized at 100° C. for 15 minutes and cooled to 37° C., and then inoculated with *St. thermophilus* and *L. bulgaricus* and incubated to a pH of 4.3 to obtain yoghurt.

(2nd Process)

On the other hand, in order to syrup, 10 g of a sweetener comprising liquid sugar of glucose and fructose, 5 ml of lemon juice and 5 g of calcium gluconate were dissolved into water to adjust to 500 ml, and pasteurized at 100° C. for 15 minutes and then cooled to less than 10° C.

In order to prepare a pectin solution, 3.5 g of blockwise-type HM pectin (manufactured by Copenhagen Pectin) were dissolved into water to adjust to 150 ml, and pasteurized at 100° C. for 15 minutes and then cooled to less than 10° C.

(3rd Process)

Subsequently, 350 ml of the above yoghurt, 500 ml of the syrup and 150 ml of a pectin solution were mixed, and homogenized at a pressure of 150 kg/cm$^2$ to obtain a drink-type calcium-enriched and physically stabilized yoghurt product of the present invention.

EXAMPLE 3

(1st Process)

A 350 ml of solution containing 25% skim milk powder was pasteurized at 100° C. for 15 minutes and cooled to 37°

C., and then inoculated with *St. thermophilus* and *L. bulgaricus* and incubated to a pH of 4.3. After the completion of incubation, the obtained yoghurt was homogenized at a pressure of 150 kg/cm$^2$.
(2nd Process)

On the other hand, in order to prepare syrup, 6.5 g of a sweetener comprising sugar, 10 ml of strawberry juice and 30 g of blockwise-type HM pectin (manufactured by Copenhagen Pectin) were dissolved into water, and pasteurized at 100° C. for 15 minutes and then cooled to less than 10° C.

In order to enrich calcium, 5 g of calcium gluconate were dissolved into water to adjust to 150 ml, and pasteurized at 100° C. for 15 minutes and then cooled to less than 10° C.
(3rd Process)

Subsequently, 350 ml of the above-homogenized yoghurt and 500 ml of the above pectin-containing syrup were mixed and stirred for 30 minutes without causing foam. Then, 150 ml of the above-prepared calcium solution were added therein, and further stirred for 10 minutes to obtain drink-type calcium-enriched and physically stabilized yoghurt.

Comparative Example 1

A drink-type calcium-enriched yoghurt product was prepared according to the same procedure as in Example 1 except that pectin and calcium gluconate-containing syrup comprising pectin and calcium gluconate compounded in advance simultaneously was prepared as syrup, in the second process of Example 1 and that of Example 2.

Comparative Example 2

A drink-type calcium-enriched yoghurt product was prepared according to the same procedure as in Example 1 except that pectin and calcium gluconate-containing syrup comprising pectin and calcium gluconate compounded in advance simultaneously was prepared as syrup, in the second process of Example 3.

Evaluation Test 1 on Methods for Producing and Products

An evaluation test on the methods for producing and the products of the above Examples 1-3 and Comparative Examples 1-2 was performed according to an ordinary procedure and the results are shown hereunder.
1) Products of the Present Invention In the case of employing the processes of the above Examples 1-3, in spite of using blockwise-type HM pectin with a high titer, the viscosity of syrup or products was from 10 to 100 cp, and they showed no rise of viscosity interfering with production and was of excellent handling. The obtained products had a low viscosity (50-100 cp) and were of good quality as drink-type products. In addition, when the products of Examples 1-3 were stored at 10° C. for a long period of time of two weeks, precipitate, separated or aggregated ingredients did not occur, and they had an excellent appearance.
2) Products of Comparative Examples In the case of employing the processes of the above Comparative Examples 1-2, the viscosity of syrup was very high (5,000-100,000 cp), and it became difficult to transfer the syrup by means of a pump; thus, there were found difficulties in treating and handling the syrup.

In addition, the obtained products had a high viscosity (400-1,000 cp), and no drink-type product with a low viscosity could be obtained. Moreover, the products had much whey by their appearance, and when they were stored at 10° C. for a long period of time of two weeks, precipitate and separated ingredients were observed in some of them; thus they showed a low resistance to storage over a long period of time.

3) Results

As a result of the above, it has been found that, in the case of the methods for producing and the products of the present invention, an excessively high viscosity due to the linking of pectin and calcium does not occur in the whole process of production and that they can be produced simply in a short time at a low energy and a low cost, differing from the case of those of Comparative Examples. Besides, it has been found that the products have good properties with a low viscosity, are extremely stabilized physically and can be stored for a long period of time, differing from those of Comparative Examples.

Example 4

(1st Process)

A 350 ml of solution containing 25% skim milk powder was pasteurized at 100° C. for 15 minutes and cooled to 37° C., and then inoculated with *St. thermophilus* and *L. bulgaricus* and incubated to a pH of 4.3 to obtain yoghurt as acidified milk.
(2nd Process)

On the other hand, in order to prepare syrup, 10 g of a sweetener of liquid sugar of glucose and fructose, 10 ml of condensed strawberry juice and 3.5 g of blockwise-type HM pectin with a DE of 70 % and a CS value of 40 (NY-1: manufactured by Copenhagen Pectin) were dissolved into water to adjust to 500 ml, and pasteurized at 100° C. for 15 minutes and then cooled to less than 10° C.

In order to enrich calcium, 5 g of calcium gluconate were dissolved into water to adjust to 150 ml, and pasteurized at 100° C. for 15 minutes and then cooled to less than 10° C.
(3rd Process)

Subsequently, 350 ml of the above yoghurt, 500 ml of the syrup and 150 ml of a calcium solution were mixed, and homogenized at a pressure of 150 kg/cm$^2$ to obtain a drink-type calcium-enriched and physically stabilized yoghurt product of the present invention.

Example 5

(1st Process)

A 350 ml of solution containing 25% skim milk powder was pasteurized at 100° C. for 15 minutes and cooled to 37° C., and then inoculated with *St. thermophilus* and *L. bulgaricus* and incubated to a pH of 4.3 to obtain yoghurt as acidified milk.
(2nd Process)

On the other hand, in order to prepare syrup, 10 g of a sweetener of liquid sugar of glucose and fructose, 10 ml of condensed strawberry juice and 3.5 g of blockwise-type HM pectin with a DE of 70% and a CS value of 50 (NY-1: manufactured by Copenhagen Pectin) were dissolved into water to adjust to 500 ml, and pasteurized at 100° C. for 15 minutes and then cooled to less than 10° C.

In order to enrich calcium, 5 g of calcium gluconate were dissolved into water to adjust to 150 ml, and pasteurized at 100° C. for 15 minutes and then cooled to less than 10° C.
(3rd Process)

Subsequently, 350 ml of the above yoghurt, 500 ml of the syrup and 150 ml of a calcium solution were mixed, and homogenized at a pressure of 150 kg/cm$^2$ to obtain a drink-type calcium-enriched physically stabilized yoghurt product of the present invention.

Example 6

(1st Process)

A 350 ml of solution containing 25% skim milk powder was pasteurized at 100° C. for 15 minutes and cooled to 37°

C., and then inoculated with *St. thermophilus* and *L. bulgaricus* and incubated to a pH of 4.3 to obtain yoghurt as acidified milk.

(2nd Process)

On the other hand, in order to prepare syrup, 10 g of a sweetener of liquid sugar of glucose and fructose, 10 ml of condensed strawberry juice and 3.5 g of blockwise-type HM pectin with a DE of 70% and a CS value of 200 (NY-1: manufactured by Copenhagen Pectin) were dissolved into water to adjust to 500 ml, and pasteurized at 100° C. for 15 minutes and then cooled to less than 10° C.

In order to enrich calcium, 5 g of calcium gluconate were dissolved into water to adjust to 150 ml, and pasteurized at 100° C. for 15 minutes and then cooled to less than 10° C.

(3rd Process)

Subsequently, 350 ml of the above yoghurt, 500 ml of the syrup and 150 ml of a calcium solution were mixed, and homogenized at a pressure of 150 kg/cm² to obtain a drink-type calcium-enriched and physically stabilized yoghurt product of the present invention.

Example 7

(1st Process)

A 350 ml of solution containing 25% skim milk powder was pasteurized at 100° C. for 15 minutes and cooled to 37° C., and then inoculated with *St. thermophilus* and *L. bulgaricus* and incubated to a pH of 4.3 to obtain yoghurt.

(2nd Process)

On the other hand, in order to prepare syrup, 6 g of a sweetener of fructose, 10 ml of condensed strawberry juice and 3.5 g of blockwise-type HM pectin with DE of 70% and a CS value of 220 (NY-1: manufactured by Copenhagen Pectin) were dissolved into water to adjust to 500 ml, and pasteurized at 100° C. for 15 minutes and then cooled to less than 10° C.

In order to enrich calcium, 5 g of calcium gluconate were dissolved into water to adjust to 150 ml, and pasteurized at 100° C. for 15 minutes and then cooled to less than 10° C.

(3rd Process)

Subsequently, 350 ml of the above yoghurt, 500 ml of the syrup and 150 ml of a calcium solution were mixed, and homogenized at a pressure of 150 kg/cm³ obtain a drink-type calcium-enriched and physically stabilized yoghurt product of the present invention.

Comparative Example 3

A drink-type calcium enriched yoghurt product was prepared by employing the same yoghurt, the same materials and the same method of preparation as in the above Examples 4–6 according to the same treatment as in Example 4 except that conventional randomwise-type pectin with a degree of esterification of 70% and a CS value of 30 (HM-1: manufactured by Sanophy Bio Industry) was used.

Comparative Example 4

A drink-type calcium-enriched yoghurt product was prepared by employing the same yoghurt, the same materials and the same method of preparation as in the above Examples 4–6 according to the same treatment as in Example 4 except that blockwise-type pectin with a degree of esterification of 70% and a CS value of 240 (YM-100: manufactured by Copenhagen Pectin) was used.

Evaluation Test 2 on Methods for Producing and Products

An evaluation test on the methods for producing and the products of the above Examples 4–7 and Comparative Examples 3–4 was performed according to an ordinary procedure and the results are shown in Table 1.

The measurement of the calcium reactivity (CS value) of HM pectin was performed according to the following method.

(1) Principle: An HM pectin solution containing a calcium ion is prepared under such conditions as a partial gelation does not occur when a calcium ion is added to HM pectin, and viscosity of it is measured. In order to avoid a reaction between a calcium ion and HM pectin, they are mixed at a low pH. After mixing, an acetic acid buffer is added into the mixture to rise a pH to a predetermined one; then a reaction starts.

(2) Reagent: 60% (V/V) aqueous isopropanol solution 1M hydrochloric acid 1M acetic acid buffer, pH=4.75

250 mM calcium chloride solution (3) Method:

1. A 105 ml of 60% (V/V) aqueous isopropanol solution (105 ml) is introduced into a 200-milliliter glass beaker.

2. While the solution of (1) is stirred, 5 g of pectin are added therein and the mixture is stirred for 0 minute.

3. The pectin dispersion of (2) is transferred into a glass filter and filtered by aspirating.

4. The filtration residue on the glass filter is washed with 15 ml of a 60% (V/V) aqueous isopropanol solution six times.

5. Subsequently, 20 ml of the isopropanol filtration residue are washed.

6. The glass filter containing the filtration residue is covered with a sheet of medicine-packing paper with a hole opened and dried at 105° C. for 2.5 hours.

7. An HM pectin solution (final pectin concentration 0.6%) is prepared by using distilled water; 1M hydrochloric acid is added therein and the mixture is adjusted to a pH of 1.5 and to a predetermined concentration.

8. The 145 g of the pectin solution with a pH of 1.5 is introduced into a viscosity-measuring glass.

9. A 5 ml of calcium chloride solution (5 ml) is added therein. The final calcium concentration becomes 8.3 mM.

10. While the solution is stirred by means of a magnetic stirrer effectively, 25 ml of an acetic acid buffer is added therein and the pH of the solution is adjusted to 4.2.

11. The magnet is taken out, and after the glass is left to stand at 25° C. till the following day, viscosity is measured by means of a Brookfield viscometer.

(4) CS Value: A CS value is shown by viscosity measured (mPa. S).

TABLE 1

Results of the Evaluation Test on Methods for Producing and Products

| | DE of pectin | CS of pectin | Stability of products | Viscosity of products | Workability (handling) |
|---|---|---|---|---|---|
| Ex. 4 | 70% | 40 | ○ | Low | No problem |
| Ex. 5 | 70% | 50 | ⊙ | Low | No problem |
| Ex. 6 | 70% | 200 | ⊙ | Low | No problem |
| Ex. 7 | 70% | 220 | ⊙ | A bit high | No problem |
| Comp. Ex. 3 | 70% | 30 | x | Low | No problem |
| Comp. Ex. 4 | 70% | 240 | ⊙ | High | High viscosity, poor |

1) Products of the Present Invention

In the case of the above Examples 4–7, the syrup or the products had a low viscosity and showed no rise of viscosity interfering with production, and was of excellent handling, in spite of using blockwise-type HM pectin with a CS value of 40–220. The obtained products had a low viscosity and were of good quality as drink-type products. In addition, when the products of Examples 4–7 were stored at 10° C. for a long period of time of two weeks, they caused no precipitate, separated or aggregated ingredients and had an excellent appearance.

2) Products of Comparative Examples

In the case of the above Comparative Example 3, the syrup or the product had a low viscosity and showed no rise of viscosity interfering with production, and was of excellent handling. The obtained product had a low viscosity and was of good quality as a drink-type product. However, when the product of Comparative Example 3 was stored at 10° C. for a long period of time of two weeks, it showed precipitate, separated and aggregated ingredients occurred on the second day, and had an extremely poor appearance and hence had no value as a product.

In the case of the above Comparative Example 4, the syrup had very high viscosity and extremely poor stirring efficiency; hence it took much time to homogenize it. In addition, after homogenizing, it became difficult to transfer the syrup by means of a pump; thus, there were found difficulties in treating and handling the syrup. In addition, the obtained product had a high viscosity and no drink-type product with a low viscosity could be obtained.

3) Results

As a result of the above, it has been found that, in the case of the products of the present invention, an excessively high viscosity due to the linking of pectin and calcium does not occur in the whole process of production and that they can be produced simply in a short time at a low energy and a low cost, differing from the case of those of Comparative Examples. Besides, it has been found that the products have good properties with a low viscosity, are extremely stabilized physically and can be stored for a long period of time, differing from those of Comparative Examples.

As described above in detail, the present invention relates to methods for producing calcium enriched high quality fermented milk and fermented milk drink by using HM pectin with a high titer, for example, blockwise-type HM pectin with a high titer; the following effects can be exhibited by the present invention:

(1) Calcium enriched acidified milk extremely stabilized physically can be produced according to simple processes in a short time at a low energy.

(2) It can be produced at a high production efficiency by using blockwise-type HM pectin with a high titer, without causing the rise of viscosity due to gelation, even if calcium with a high reactivity with said pectin is enriched.

(3) It becomes possible to increase the amount of calcium to be enriched in products more by using blockwise-type pectin with a CS value of 40–220.

(4) Products extremely stabilized physically and capable of being stored for a long period of time can be obtained without causing precipitate, separated and aggregated ingredients, which have been deemed to be problems to be solved, even if they are stored for a long period of time.

What is claimed is:

1. A method for producing calcium enriched fermented milk or fermented milk drink having excellent physical stability, which comprises separately adding blockwise-type HM pectin and calcium, individually, either or both of them, together with syrup into lactic acid-fermented acidified milk, and then subjecting the resulting mixture to a homogenizing treatment.

2. A method for producing calcium enriched fermented milk or fermented milk drink having excellent physical stability, which comprises of subjecting lactic acid-fermented acidified milk to a homogenizing treatment, adding syrup and blockwise-type HM pectin thereinto followed by mixing, and then adding calcium into the resulting mixture followed by mixing.

3. The method according to claim 1, wherein the calcium is added to the acidified milk after adding the pectin.

4. The method according to claim 1, wherein the pectin is added to the acidified milk after adding the calcium.

5. The method according to claim 1, wherein the pectin and calcium are separately added from separate sources to the acidified milk.

* * * * *